(12) United States Patent
Terwilliger et al.

(10) Patent No.: US 9,596,149 B2
(45) Date of Patent: Mar. 14, 2017

(54) SERVER INFORMATION HANDLING SYSTEM NFC TICKET MANAGEMENT AND FAULT STORAGE

(71) Applicant: Dell Products L.P., Round Rock, TX (US)

(72) Inventors: Kevin D. Terwilliger, Austin, TX (US); Travis E. Taylor, III, Hutto, TX (US); Syed S. Ahmed, Round Rock, TX (US); John R. Palmer, Georgetown, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 63 days.

(21) Appl. No.: 14/294,487

(22) Filed: Jun. 3, 2014

(65) Prior Publication Data

US 2015/0312087 A1  Oct. 29, 2015

Related U.S. Application Data

(63) Continuation-in-part of application No. 14/259,574, filed on Apr. 23, 2014.

(51) Int. Cl.
*H04B 7/00* (2006.01)
*H04B 17/00* (2015.01)
*H04W 24/00* (2009.01)
*H04L 12/24* (2006.01)
*H04W 4/00* (2009.01)
*G06F 1/00* (2006.01)
*G06F 11/00* (2006.01)

(52) U.S. Cl.
CPC ............ *H04L 41/5074* (2013.01); *G06F 1/00* (2013.01); *G06F 11/00* (2013.01); *H04L 41/069* (2013.01); *H04L 41/0686* (2013.01); *H04W 4/008* (2013.01); *H04L 41/0816* (2013.01); *H04L 41/0846* (2013.01)

(58) Field of Classification Search
CPC .................................................... H04B 5/0031
USPC ........ 455/41.1–41.3, 423–425, 67.11, 67.13, 455/67.14
See application file for complete search history.

(56) References Cited

U.S. PATENT DOCUMENTS

| | | | |
|---|---|---|---|
| 4,270,168 A * | 5/1981 | Murphy et al. | 714/10 |
| 6,701,460 B1 * | 3/2004 | Suwandi | G06F 11/2215 714/38.1 |
| 7,225,239 B2 * | 5/2007 | King | G06F 1/183 709/220 |

(Continued)

*Primary Examiner* — Simon Nguyen
(74) *Attorney, Agent, or Firm* — Terrile, Cannatti, Chambers & Holland, LLP; Robert W. Holland

(57) ABSTRACT

Server information handling system deployment and maintenance is enhanced with automated trouble ticket generation at a mobile telephone through an NFC transaction with a management controller. NFC transactions coordinate authorization for replacement component installation and server information handling system replacement. In one embodiment, a bezel includes an NFC device that interfaces with a management controller and stores configuration information to aid installation of replacement server information handling systems in the event of a system failure. A back-up battery provides power to an NFC support circuit that stores fault codes detected by the management controller so that fault codes are available during management controller failures.

19 Claims, 6 Drawing Sheets

(56) References Cited

U.S. PATENT DOCUMENTS

| | | | |
|---|---|---|---|
| 7,321,312 B1 * | 1/2008 | Garnett | G06F 11/326 340/635 |
| 7,516,025 B1 * | 4/2009 | Williams | G05B 23/0278 702/182 |
| 7,561,875 B1 * | 7/2009 | Eberle | 455/423 |
| 7,890,677 B2 | 2/2011 | Chandrasekhar et al. | |
| 7,934,054 B1 | 4/2011 | Moll et al. | |
| 8,116,759 B2 | 2/2012 | Ying | |
| 8,321,922 B1 | 11/2012 | Lo et al. | |
| 9,055,120 B1 | 6/2015 | Firman | |
| 2002/0138235 A1 | 9/2002 | Edwards et al. | |
| 2003/0127067 A1 | 7/2003 | Karnes | |
| 2003/0191877 A1 * | 10/2003 | Zaudtke et al. | 710/72 |
| 2006/0248407 A1 | 11/2006 | Adams, Jr. et al. | |
| 2008/0042830 A1 | 2/2008 | Chakraborty et al. | |
| 2008/0081608 A1 | 4/2008 | Findikli et al. | |
| 2008/0300009 A1 | 12/2008 | Quinn et al. | |
| 2009/0279673 A1 | 11/2009 | Maffre et al. | |
| 2010/0042571 A1 | 2/2010 | Dobbins et al. | |
| 2010/0178868 A1 | 7/2010 | Charrat | |
| 2010/0277866 A1 | 11/2010 | Chen | |
| 2011/0312272 A1 | 12/2011 | Goto et al. | |
| 2012/0261479 A1 | 10/2012 | Moore et al. | |
| 2012/0289155 A1 | 11/2012 | Dua | |
| 2012/0290886 A1 | 11/2012 | Wilson, Jr. | |
| 2012/0309302 A1 | 12/2012 | Buhot | |
| 2012/0315848 A1 | 12/2012 | Smith et al. | |
| 2013/0124346 A1 * | 5/2013 | Baldwin et al. | 705/16 |
| 2013/0179558 A1 | 7/2013 | Lin et al. | |
| 2013/0215467 A1 | 8/2013 | Fein et al. | |
| 2013/0252543 A1 | 9/2013 | Badi et al. | |
| 2013/0332363 A1 | 12/2013 | Renard et al. | |
| 2014/0045426 A1 | 2/2014 | Cho | |
| 2014/0074346 A1 * | 3/2014 | Chiaverini | 701/31.5 |
| 2014/0074537 A1 | 3/2014 | Bargetzi et al. | |
| 2014/0107886 A1 | 4/2014 | Miljkovic et al. | |
| 2014/0154979 A1 * | 6/2014 | Tomas et al. | 455/41.1 |
| 2014/0235162 A1 | 8/2014 | Gallo et al. | |
| 2014/0256251 A1 * | 9/2014 | Caceres et al. | 455/41.1 |
| 2014/0329467 A1 | 11/2014 | Ewing et al. | |
| 2015/0017911 A1 | 1/2015 | Liu | |
| 2015/0046748 A1 * | 2/2015 | Uchida | 714/14 |
| 2015/0081538 A1 | 3/2015 | Renard et al. | |
| 2015/0089221 A1 | 3/2015 | Taylor et al. | |
| 2015/0140986 A1 | 5/2015 | Lamb et al. | |
| 2015/0149320 A1 | 5/2015 | Smirin | |
| 2015/0186871 A1 | 7/2015 | Laracey | |
| 2015/0222663 A1 | 8/2015 | Patange et al. | |

* cited by examiner

SERVER INFORMATION HANDLING SYSTEM NFC TICKET MANAGEMENT AND FAULT STORAGE

CONTINUING DATA

This application is a continuation-in-part of U.S. patent application Ser. No. 14/259,574, filed Apr. 23, 2014, entitled "NFC Communication with an Information Handling System Supplemented by a Management Controller and Advertised virtual Tag Memory," by Shawn Dube and Syed S. Ahmed, which includes exemplary systems and methods and is incorporated by reference in its entirety.

CROSS REFERENCE TO RELATED APPLICATION

U.S. patent application Ser. No. 14/272,805, entitled "Server Information Handling System NFC Ticket Management And Fault Storage" by inventors Kevin D. Terwilliger, Travis E. Taylor, Syed S. Ahmed, and John R. Palmer, filed on May 8, 2014, describes exemplary methods and systems and is incorporated by reference in its entirety.

BACKGROUND OF THE INVENTION

Field of the Invention

The present invention relates in general to the field of server information handling system management, and more particularly to a server information handling system NFC ticket management and fault storage.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Server information handling systems are typically centrally located in a data center that has specialized infrastructure to provide networking, power and cooling resources. Often, plural server information handling systems are stacked in racks that have plural slots to provide infrastructure interfaces. For example, a typical server rack includes multiple power supplies and a communication switch that each supports server information handling systems installed in slots of the rack. Racks are disposed in a room having a controlled environment, such as with cooling air vented near each rack. The server information handling systems typically include a baseboard management controller (BMC) that allows remote support operations, such as network-based power-up, power-down, component monitoring, firmware updates and other management operations. Generally, BMC's communicate with administrative tools through an out-of-band management network that is separate from the networks that the server information handling systems functionally serve. For instance, a server information handling system serves client requests responsive to enterprise functions performed over the Internet through a primary network interface and is managed by administrative network tools through a secondary management network.

In modern cloud networking configurations, physical server information handling systems provide physical processing resources that support virtual processing devices, such as virtual machines. As a result, in a given data center, a physical mapping of enterprise functions to the physical machine performing the enterprise functions is often not immediately available and frequently changing. In effect, the physical maintenance of server information handling systems is separate from the maintenance of virtual machines that run over the physical systems. As a physical server information handling system runs into difficulty executing an enterprise function, such as due to processing load or failure of components, the enterprise function virtual machine migrates to different physical resources. Although cloud networking helps to achieve efficient use of processing resources, it does tend to increase the difficulty of identifying and addressing physical processing resource failures and maintenance since there is little available direct relationship between difficulties in performing processing functions and difficulties with underlying physical processing resources.

One advantage of cloud computing and other virtualized networking techniques is that server information handling systems become black boxes that can fit into server racks as needed to replace broken server systems or to expand processing capabilities available for virtual systems. Information technology administrators often work on data center floors to address physical resource maintenance and replacement independent of functional resources running over the information handling systems. Once a server information handling system is repaired or replaced at a rack slot, the information technology administrator powers the server up and configures the server to interact with the management and functional network resources. After the server information handling system is under the control of administrative tools through the management network, remote management controls are typically effective to return the server information handling system into the pool of functional resources.

One difficulty with maintenance and replacement of server information handling systems is that information technology administrators must correctly identify server information handling systems in the data center that have faults and need replacement or maintenance. Typically, information technology administrators in a data center will move a "crash" cart between server racks to investigate issues indicated locally by LED lights or small LED panels, or indicated remotely by communications from BMCs to administration tools. Once issues are spotted, the information technology administrator will typically interface to the BMC locally with a USB or other cable interface in order to retrieve detailed information regarding the fault and determine an appropriate corrective action. Generally, the information technology administrator fills out a trouble ticket based upon the indicated fault and submits the trouble ticket to an administrative tool to schedule maintenance, such as replacement of failed components or of the server information handling system. One difficulty with tracking failures by trouble tickets is that complicated identification information and error codes can sometimes lead to errors at the input of trouble ticket information. Another difficulty that sometimes arises is that a dead server information handling system is unavailable to provide information at the data center floor related to the failure. For example, a complete failure of a server information handling system and its BMC is typically analyzed by removal of the server information handling system for post mortem outside of the data center room.

SUMMARY OF THE INVENTION

Therefore a need has arisen for a system and method which supports automated issue identification, tracking and resolution proximate a server information handling system housing.

A further need exists for a system and method that provides fault information proximate a server information handling system housing in the event of power failure.

In accordance with the present invention, a system and method are provided which substantially reduce the disadvantages and problems associated with previous methods and systems for server information handling system management and/or maintenance. An NFC device interfaced with a server information handling system management controller provides fault codes detected by the management controller to a portable information handling system, such as a mobile telephone, for automated generation of trouble tickets to report the fault. Faults are maintained for access by the NFC device even in the event of power failure by a backup battery that powers memory storing the fault codes that is interfaced with the NFC device.

More specifically, plural server information handling systems deployed in proximity to each other, such as in a common rack or data center, each have an NFC device interfaced with a management controller, such as a baseboard management controller, that detects and reports faults associated with the server information handling system. As faults are detected, the BMC logs the faults in memory accessible by the NFC device. An information technology administrator obtains the faults by an NFC transaction to the NFC device with a portable information handling system, such as a smartphone. If the fault results in power failure, a backup battery maintains the fault information in memory. An application running on the smartphone automatically completes a trouble ticket form with the information provided by the NFC transaction and reports the trouble ticket to an administrative tool. The administrative tool issues service tickets that direct corrective actions coordinated by NFC transactions. For example, a service ticket issued to a smartphone directs an information technology administrator to repair the server information handling system with a selected part. NFC transactions between the selected part, the server information handling system and the smartphone ensure that the correct part is placed in the correct server information handling system with the correct configuration information. If a server information handling system replacement is specified in a service ticket, then a removable bezel that integrates the NFC device is removed from the failed server and placed on the replacement server to aid in the transfer of configuration information stored in tag memory of the NFC device. Unique identifiers of the server information handling systems are referenced to ensure that configuration information on a bezel does not transfer to an incorrect server. If a bezel is placed on a server that does not match a unique identifier stored in the bezel's NFC device, then the NFC tag is wiped clean.

The present invention provides a number of important technical advantages. One example of an important technical advantage is that an information technology administrator is able to obtain management information when proximate a server information handling system housing by an NFC transaction to a portable information handling system, such as a smartphone. Configuration and identification information of the server information handling system along with fault codes are automatically passed by NFC transaction to a portable information handling system so that trouble tickets are quickly and accurately generated. Further, fault codes are maintained in RAM with a standby battery so that NFC transactions include the final available fault codes detected at system power failure. An information technology administrator who reads fault codes from a failed system may sometimes be able to take corrective action on the installed system without performing a replacement, thus reducing disruptions to data center operations. NFC capabilities on a BMC and also replaceable components helps to ensure that authentic and authorized repair components are installed in response to a trouble ticket, thus reducing the risk that corrective actions will result in additional maintenance issues. For example, a service ticket generated in response to a trouble ticket embeds credentials based upon the NFC transaction that generated the trouble ticket so that the correct server information handling system is serviced with the correct replacement components by the correct technician. In one embodiment, the NFC device is included in a bezel that selectively attaches to a server information handling system so that configuration information remains with a bezel when the bezel is removed from a server information handling system. The bezel NFC erases configuration information if an identifier of a server information handling to which the bezel attaches changes to an unexpected value, thus limiting the risk that incorrect configuration information will be applied to a server information handling system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An NFC device with battery back-up disposed in a server information handling system bezel provides automated trouble ticket reporting and response even in the event of power failure at the server information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
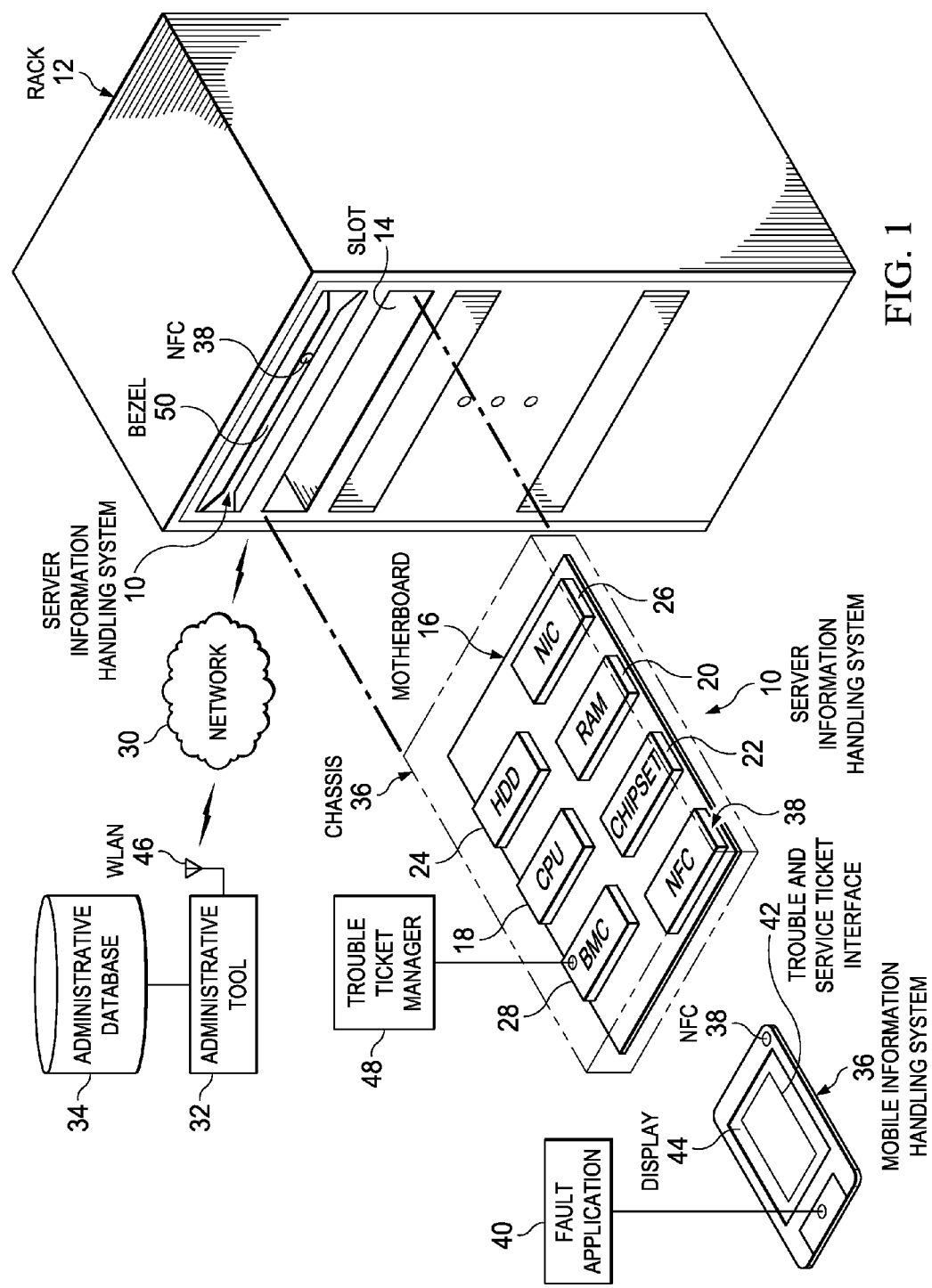
FIG. 1 depicts a block diagram of a system for automated trouble ticket reporting at a server information handling system with an NFC transaction.

Referring now to FIG. 1, a block diagram depicts a system for automated trouble ticket reporting at a server information handling system 10 with an NFC transaction. Information handling systems 10 depicted by the example embodiment of FIG. 1 are co-located in a common rack 12 with each server information handling system 10 inserted in a slot 14 that provides power, cooling and wired networking infrastructure. Each server information handling system 10 processes information with components disposed on a motherboard 16, such as one or more central processing units (CPUs) 18 that executes instructions, random access memory (RAM) 20 that stores instructions and information, a chipset 22 that includes firmware to coordinate actions between the processing components, a hard disk drive (HDD) 24 that provides persistent storage, and one or more network interface cards (NICs) 26 that communicate with a wired network, such as Ethernet. Server information handling system 10 includes a management controller, such as a baseboard management controller (BMC) 28, which provides remote management functions through a network 30. For example, BMC 28 allows an administrative tool 32 to perform remote power up and power down as well as to perform maintenance, such as software and firmware patches. Administrative tool 32 tracks server hardware, software and security information with an administrative database 34.

During normal operations, plural racks disposed in a data center each have plural server information handlings 10 that process client requests through network 30, such as the Internet. Operations of the server information handling systems 10 are monitored by BMC's 28 for faults, such as failed components, reduced performance, thermal constraints and power consumption. If a server information handling system 10 fails or has a fault, a report is made to administrative tool 32 so that an information technology administrator can take corrective action, such as with remote commands through BMC 28 or through physical interactions with the server information handling system 10 on the datacenter floor. Server information handling systems also typically include visual indicators of faults that are managed by BMC 28, such as set of LEDs or a small display integrated with a chassis 36 that supports components of the server information handling system 10. In a typical scenario, an information technology administrator in a data center has a trouble cart with tools and spare components to address failures in a prompt manner as the failures arise. The trouble cart may travel to racks 12 and server information handling systems 10 based upon instructions sent from administrative tool 32 or may locate difficulties based upon visual indicators at a server information handling system 10, such as flashing LEDs. Once a server information handling system 10 is located with one or more faults, the information technology administrator fills out a "trouble ticket" to report the fault to the administrative tool 32. Authorization to take actions in response to a trouble ticket is then provided with a "service ticket" from administrative tool 32, such as an authorization to replace the server information handling system 10 or faulty components in the server information handling system 10.

In order to simplify the completion of trouble tickets and responses to service tickets, a mobile telephone information handling system 36 (or other portable information handling system, such as a tablet or laptop) interacts through NFC transactions supported by NFC devices 38 to manage repairs and replacements at server information handling systems 10. Mobile telephone information handling system 36 executes a fault application 40 to present a trouble and service ticket interface 42 at a display 44. An information technology administrator carries mobile telephone information handling system 36 in the data center and responds to fault indications provided by administrative tool 32 or by visual indicators, such as LED indications of faults. Once the information technology administrator reaches the proximity of the server information handling system 10, placing NFC device 38 of mobile telephone information handling system 36 proximate NFC device 38 of server information handling system 10 results in an NFC transaction that passes fault information detected by BMC 28 to mobile telephone information handling system 36. For instance, a trouble ticket manager 48 passes fault codes detected by BMC 28 along with identification information of the server information handling system to fault application 40 of mobile telephone 36. Fault application 40 accepts the fault information and automatically fills out a trouble ticket to report the fault to administrative tool 32. Since all of the information needed to complete the trouble ticket is passed by the NFC transaction, the trouble ticket is prepared and presented at trouble and service ticket interface 42 without end user inputs. Once a trouble ticket is prepared, the information technology administrator is able to edit the trouble ticket if necessary and then send the trouble ticket to administrative tool 32.

Administrative tool 32 applies the trouble ticket to generate a service ticket that provides the information technology administrator with authorization and instructions for repairing or replacing the server information handling system. For example, if a fault code indicates that a particular component has failed, the service ticket identifies a replacement component for use to replace the failed component, such as replacement located on the crash cart of the information technology administrator assigned to fix the server information handling system. Alternatively, if the server information handling system has failed to a point that the entire system needs replacement, the service ticket identifies a replacement server information handling system 10, such as by a unique service identifier stored in the BMC of the replacement system. Administrative tool 32 sends the service ticket through a wireless local area network (WLAN) 46 or a mobile telephone wireless wide area network (WWAN) to the mobile telephone information handling system 36 of the information technology administrator assigned to address the fault. The components addressed by the service ticket are stored in administrative database 34 to provide precise tracking by unique identifier of each server information handling system 10 and each component in the datacenter. Since unique identifiers are automatically loaded into trouble and service tickets, inadvertent errors due to typographical inputs are avoided.

When an information technology administrator approaches a server information handling system 10 to address a service ticket, NFC transactions between the server information handling system 10, replacement components and mobile telephone information handling system 36 help to ensure that the correct repairs are performed. For example, if a hard disk drive is prescribed by the service ticket, an NFC transaction between the hard disk drive and the mobile telephone ensures that the replacement component used by the information technology administrator matches that of the service ticket. Once the fault application obtains the replacement components information, another NFC transaction between mobile telephone 36 and a server information handling system 10 allows transfer of the replacement component information to the server information handling system. As another example, an NFC transaction between the server information handling system 10 BMC 28 NFC 38 and the replacement hard disk drive allows BMC 28 to confirm the correct component and prepare configuration of the new hard disk drive. Similarly, an NFC transaction between the BMC 28 NFC device 38 and the failed hard disk drive allows BMC 28 to confirm that the correct hard disk drive was removed by the information technology administrator. As repairs are completed at a server information handling system 10, administrative tool 32 updates administrative database 34 to reflect the changed system configurations as confirmed by NFC transactions and BMC communications through network 30.

Figure 2:
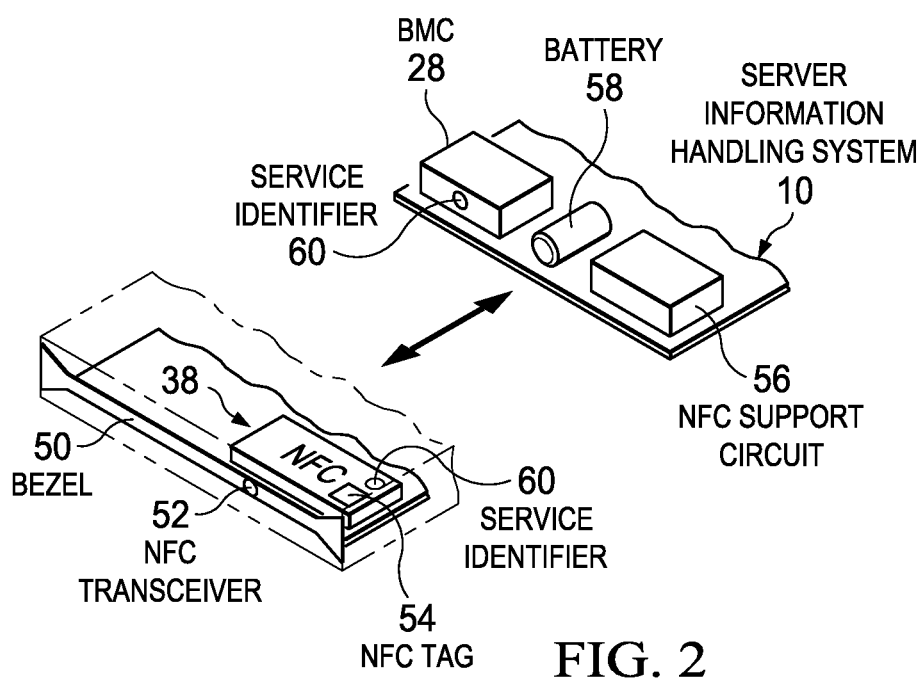
FIG. 2 depicts a system for NFC transactions of server information handling system failure codes at power failure.

Referring now to FIG. 2, a system is depicted for NFC transactions of server information handling system 10 failure codes at power failure. A bezel 50 removably couples to server information handling system 10 so that an information technology administrator is able to completely detach bezel 50 and re-attach bezel 50. NFC device 38 is integrated with bezel 50, including an NFC transceiver 52 that performs NFC transactions from and NFC tag memory 54. NFC device 38 when detached from server information handling system 10 supports NFC transactions without power by using a requesting device's RF energy to transmit information stored in persistent flash memory of NFC tag memory 54. NFC device 38 interfaces with an NFC support circuit 56 that is integrated with server information handling system 10. For example, NFC support circuit 56 is a microcontroller that integrates RAM and flash memory as disclosed in greater detail in U.S. patent application Ser. No. 14/259,574, entitled "NFC Communication with an Information Handling System Supplemented by a Management Controller and Advertised virtual Tag Memory," by Shawn Dube and Syed S Ahmed, filed Apr. 23, 2014, which is incorporated herein by reference as if fully set forth. For example, NFC device 38 and NFC support circuit 56 communicate through a serial interface that snaps into place when bezel 50 couples to server information handling system 10. NFC support circuit interfaces with BMC 28 to receive fault information and provide enhanced NFC transactions, such as with a virtual tag memory supported by RAM integrated within NFC support circuit 56. During normal operations, NFC support circuit 56 is power under management of BMC 28, however, if BMC 28 does not have power, then a back-up battery 58 provides power to NFC support circuit 56 so that it may continue to support NFC device 38.

One advantage of removable bezel 50 is that configuration information for server information handling system 10 is stored locally in persistent NFC tag memory 54 to allow more rapid and accurate configuration of replacement server information handling system. For example, if a service ticket calls for replacement of a server information handling system 10, the information technology administrator removes bezel 50 from the installed server information handling system and places bezel 50 on the replacement server information handling system. When the replacement server information handling system 10 powers up, its BMC 28 queries NFC support circuit 56 to find configuration information, if any, stored in NFC tag memory 54. If NFC tag memory 54 includes configuration information, then BMC 28 applies the configuration information to configure server information handling system 10. Storage in bezel 50 of configuration information, such as network addresses, boot order, etc. . . . , allows an information technology administrator to coordinate configuration of server information handling systems 10 interacting with a network before bezels 50 are installed, thus reducing the time spent in a datacenter deploying new or repaired systems. In order to confirm that a bezel 50 is connected with an intended server information handing system 10, a unique identifier, such as service identifier 60, is stored with the configuration information. If BMC 28 retrieves configuration information from NFC device 38, then BMC compares the service identifier 60 retrieved with the configuration information to the BMC's own service identifier to confirm that the bezel is intended to couple to server information handling system 10. In one embodiment, NFC support circuit 56 compares the service identifier 60 stored in NFC tag memory 54 with the service identifier 60 of BMC 28 and erases the configuration information if the service identifiers 60 do not match. If a replacement server information handling system 10 is installed and intended to accept the stored configuration information, then an NFC transaction from mobile telephone 36 provides the replacement service identifier 60 to the NFC tag so that a transfer of existing configuration information is permitted.

On advantage of back-up battery 58 that powers NFC support circuit 56 is that fault information is stored for access by NFC transactions even after failure of a server information handling system 10. For example, if power fails at server information handling system 10, then pre-failure logic of BMC 28, such as logic running on reserve capacitance of the BMC circuit board, automatically saves all existing fault codes to memory of NFC support circuit 56. When an information technology administrator approaches the failed server information handling system 10, he is able to retrieve fault codes with an NFC transaction that accesses NFC support circuit 56 memory powered by back-up battery 58. Advantageously, NFC transaction access to fault codes after power failure at server information handling system 10 allows the information technology administrator to analyze a failure and, if possible, repair server information handling system 10 while still installed in the datacenter. Thus, a minor failure that results in power down, such as a cooling fan or power supply failure, is repaired without the inconvenience and cost associated with removal and replacement of the server information handling system.

Figure 3:
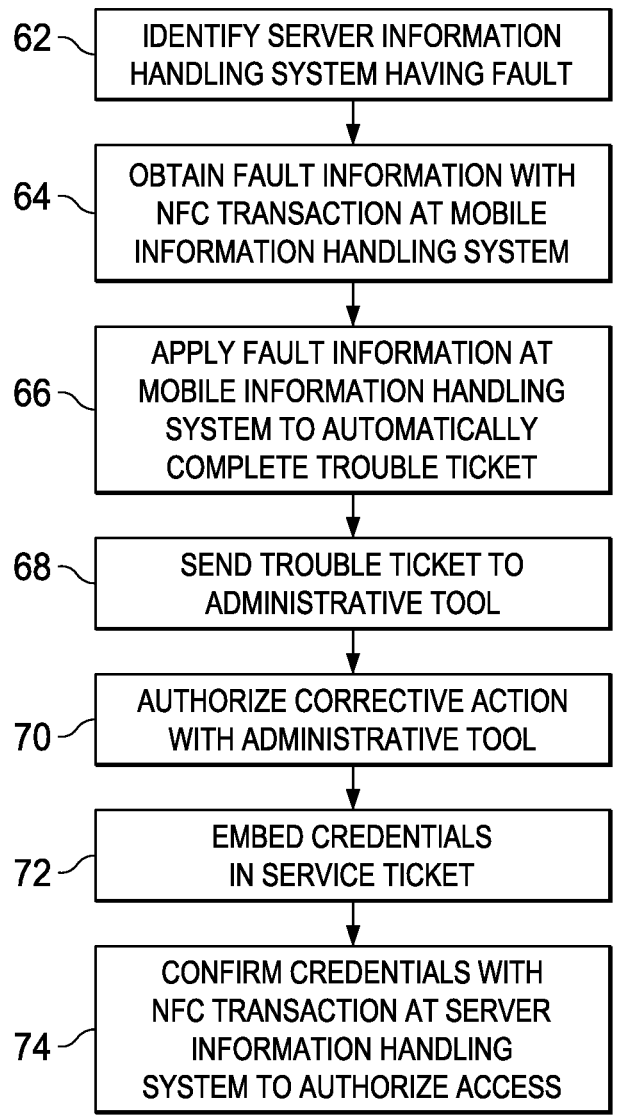
FIG. 3 depicts a flow diagram of a process for automated generation of a server information handling system trouble ticket with an NFC transaction.

Referring now to FIG. 3, a flow diagram depicts a process for automated generation of a server information handling system trouble ticket with an NFC transaction. The process begins at step 62 with identification of the server information handling system having the fault, such as with a BMC notification to an administrative tool or a visual indication with LEDs seen by an information technology administrator on a datacenter floor. At step 64, fault information, such as fault codes, are obtained from the server information handling system with an NFC transaction to a portable information handling system held by an information technology administrator proximate to the server information handling system. At step 66, the fault information obtained through the NFC transaction is applied at the portable information handling system, such as mobile telephone, to automatically complete a trouble ticket on the portable information handling system. In one example embodiment, an application running on the portable information handling system requests information by NFC transaction that is needed to fill out the trouble ticket. In another example embodiment, instructions running on the BMC or NFC support circuit have fields for the trouble ticket pre-completed and ready to download upon request by an NFC transaction. In yet another example embodiment, the NFC transaction instructs the BMC to automatically generate a trouble ticket from the pre-completed fields and to send the trouble ticket through the BMC management network to the administrative tool. In alternative embodiments, alternative instructions may be used to apply the fault codes and other server information to complete an appropriate trouble ticket.

At step 68, the trouble ticket with the fault information and identifier for the associated server information handling system 10 is sent to an administrative tool. At step 70, corrective action in response to the fault code is authorized at the administrative tool, such as replacement of a failed component or server information handling system with a replacement component or server information handling system. Authorization of correction action may include specific actions and predetermined components that the corrective action must include so that the repair has a reduced risk of causing problems in the operation of the datacenter. At step 72, credentials for performing the authorized repair are embedded in a service ticket and the service ticket is dispatched to initiate the corrective action. By issuing a service ticket with credentials, such as an encrypted passcode also sent to the BMC that identifies the individual performing the repairs, access to the server information handling system is selectively restricted, such as with a bezel lock controlled by the BMC. At step 74, the credentials are confirmed at the server information handling system with an NFC transaction from a portable information handling system, such as smartphone. In one example embodiment, the credentials are based upon a user name and password of an information technology administrator assigned to perform the service. In another embodiment, the credentials include a unique identifier for the server information handling system under repair and for each of the components authorized for use in the repair. Should a repair take place that differs from that authorized by the service ticket, the administrative tool is notified and the service ticket maintained open until the repair is completed as defined.

Figure 4:
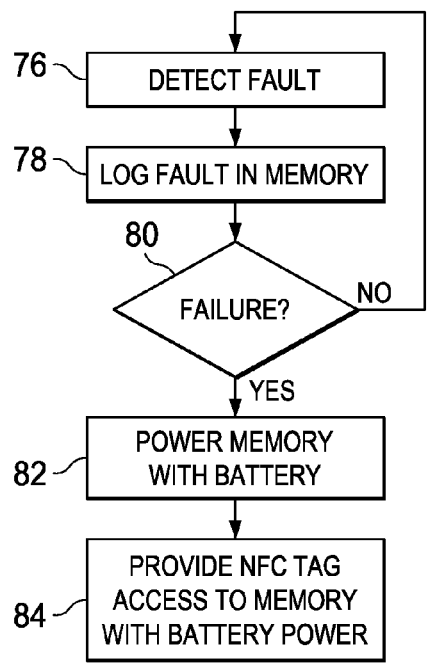
FIG. 4 depicts a flow diagram of a process for providing server information handling system fault codes in the event of a power failure.

Referring now to FIG. 4, a flow diagram depicts a process for providing server information handling system fault codes in the event of a power failure. The process begins at step 76 with detection of a fault at the server information handling system, such as with logic running on a BMC. At step 78, the detected fault is logged as a fault code in memory of the NFC support circuit, such as by communicating fault codes as the codes are detected to RAM in a microcontroller disposed between the BMC and NFC device. At step 80, a determination is made of whether the fault has resulted in a failure of the server information handling system, such as a power failure that causes the BMC to power down. If not, then the process returns to step 76 to continue monitoring of the fault codes as the fault codes are detected. If a failure causes a power down at step 80, the process continues to step 82 at which the memory of the NFC support circuit that stores fault codes is powered by the backup battery. At step 84, the backup power provides NFC tag access to the fault codes in the NFC support circuit memory. An end user is thus able to retrieve fault codes from a completely dead server information handling system by an NFC transaction supported with the backup battery. In one alternative embodiment, the backup battery provides power to write the fault codes into persistent memory of the NFC tag so that the fault codes remain available even after the backup battery charge is expended.

Figure 5:
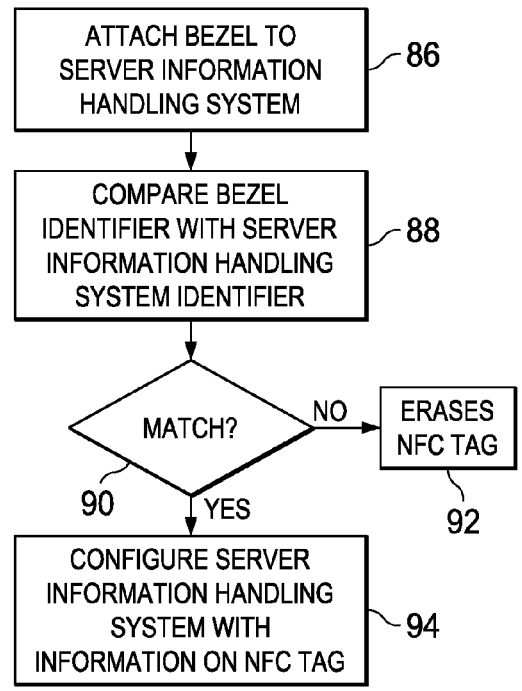
FIG. 5 depicts a flow diagram of a process for transferring configuration information with a server information handling system bezel having an integrated NFC device.

Referring now to FIG. 5, a flow diagram depicts a process for transferring configuration information with a server information handling system bezel having an integrated NFC device. The process starts at step 86 by attaching the bezel to the server information handling system so that the integrated NFC device communicates with the BMC, such as through a serial interface. At step 88, a comparison is performed of the server information handling system unique identifiers stored on the BMC and in the NFC device integrated in the bezel. The comparison may be performed at the bezel with logic associated with the NFC device, at an NFC support circuit disposed between the BMC and NFC device or at the BMC. At step 90, a determination is made of whether the unique identifier stored on the NFC device, such as in the tag memory, matches a unique identifier of the server or servers allowed to couple with the bezel. If the unique identifiers do not match, the process continues the step 92 to erase information stored in the tag memory of the NFC device. By erasing the tag memory where the bezel and information handling system unique identifiers do not match, assurance is provided that configuration information stored in the tag memory will not be applied to an unintended server information handling system. If the unique identifiers match at step 90, the process continues to step 94 to configure the information handling system with configuration information stored in the tag memory. In one example embodiment, a bezel removed from a failed server information handling system has the unique identifier of a replacement server information handling system stored in its tag memory by an NFC transaction so that the bezel provides the configuration information of the failed system to the replacement system when the bezel is placed on the replacement system.

Figure 6:
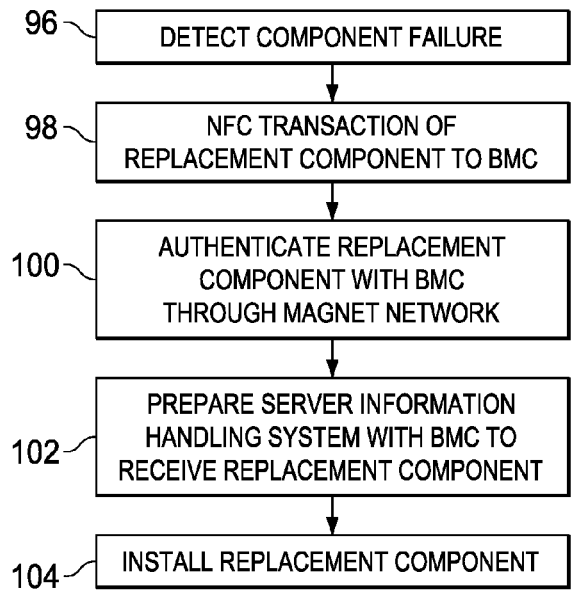
FIG. 6 depicts a flow diagram of a process for authentication or a replacement component at a server information handling system BMC with an NFC transaction from the replacement component to the BMC.

Referring now to FIG. 6, a flow diagram depicts a process for authentication of a replacement component at a server information handling system BMC with an NFC transaction from the replacement component to the BMC. The process starts at step 96 with detection of a components failure, such as by a BMC monitoring server operations or an information technology administrator walking datacenter to observe LED indicators. At step 98, an NFC transaction is accomplished between an NFC device of the replacement component and a server information handling system BMC to provide the BMC with an identifier and configuration information for the replacement component, such as drivers to incorporate the replacement component into the server. In one embodiment, the replacement component is selected in a service ticket provide from an administrative tool. At step 100, the replacement component is authenticated with a server BMC by comparing the information received by the NFC transaction with expected information. For example, the BMC compares an identifier of the replacement component with an identifier indicated by a service ticket to ensure that the replacement component is the correct part. As another example, the BMC compares the type of replacement component with permissible types of components to ensure that the replacement component is compatible with the server information handling system. At step 102, the BMC prepares the server information handling system to accept the replacement component, such as by loading any necessary drivers or adjusting any configuration settings at the server based upon the information received by the NFC transaction. At step 104, the replacement component is installed in the server information handling system and supported by the BMC based upon the information provided from the replacement component to the BMC by the NFC transaction. In one embodiment, physical access to the server information handling system is restricted until installation is authorized by the BMC based upon the NFC transaction from the replacement component to the BMC.

Figure 7:
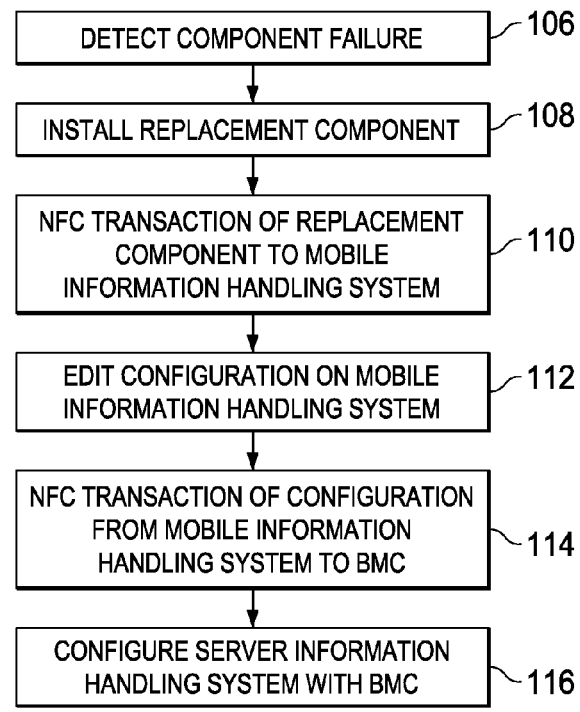
FIG. 7 depicts a flow diagram of a process for configuration of a replacement component with NFC transactions through a mobile telephone.

Referring now to FIG. 7, a flow diagram depicts a process for configuration of a replacement component with NFC transactions through a mobile telephone. The process starts at step 106 with detection of a component failure at a server information handling system. At step 108, a replacement component for the failed component is installed in the server information handling system. At step 110, an NFC transaction is performed from the BMC to the mobile telephone of the replacement component configuration as detected by the BMC. At step 112, the configuration of the replacement component is edited on the mobile telephone to a desired configuration. At step 114, an NFC transaction is performed from the mobile telephone to the BMC with the edited configuration information. At step 116, the server information handling system applies the edited configuration information to configure the replacement component. Advantageously, performing the configuration update in this manner allows completion of the configuration process and verification that the server is operating correctly before the information technology administrator leaves the location of the server information handling system.

Figure 8:
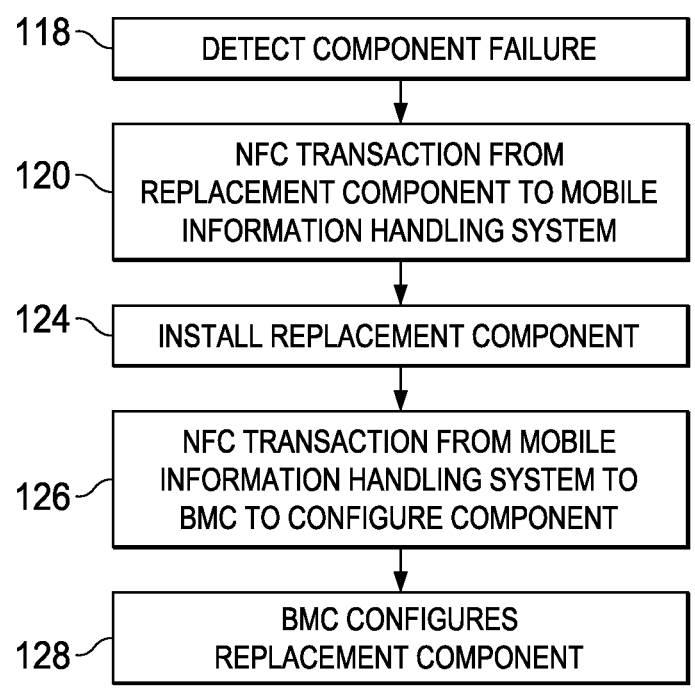
FIG. 8 depicts a flow diagram of a process for configuration of a replacement component by a BMC with NFC transactions through a mobile telephone.

Referring now to FIG. 8, a flow diagram depicts a process for configuration of a replacement component by a BMC with NFC transactions through a mobile telephone. The process starts at step 118 with detection of a failure at a server information handling system. At step 120, an NFC transaction is performed from the replacement component to a mobile telephone to provide the mobile telephone with configuration information of the replacement component. At step 124, the replacement component is installed in an information handling system. At step 126, an NFC transaction is performed from the mobile telephone to the server BMC to provide the configuration information of the replacement component to the BMC. At step 128, the BMC applies the configuration information to configure the replacement component to interact with the server information handling system.

Although the present invention has been described in detail, it should be understood that various changes, substitutions and alterations can be made hereto without departing from the spirit and scope of the invention as defined by the appended claims.

What is claimed is:

1. A server information handling system comprising:
a chassis;
a processor disposed in the chassis and operable to execute instructions that process information;
memory disposed in the chassis, interfaced with the processor and operable to store the instructions and information;
a management controller disposed in the chassis, interfaced with the processor and non-transitory memory storing instructions executable by the management controller to support remote management functions including at least tracking faults by fault codes in a management controller memory, the management controller detecting power failures of the server information handling system and storing the fault codes in the memory in response to the detecting the power failure;
a near field communication (NFC) device interfaced with the management controller and operable to communicate the fault codes with an NFC transaction to an external NFC device; and
a back-up battery interfaced with the management controller memory and operable to power the management controller memory in the event of power failure so that the management controller memory provides access to the fault codes by the NFC device during power failure that prevents power to the management controller.

2. The server information handling system of claim 1 further comprising:
an NFC support circuit interfaced with the battery, the management controller and the NFC device, the NFC support circuit operable to run with power from the battery upon failure of the server information handling system, the NFC support circuit providing the fault codes stored in a management controller memory at the failure to the NFC device for communication by the NFC transaction to the external NFC device system.

3. The server information handling system of claim 2 wherein the battery is integrated with the NFC support circuit.

4. The server information handling system of claim 2 wherein the battery is integrated with the management controller.

5. The server information handling system of claim 2 wherein the battery is integrated with the NFC device.

6. The server information handling system of claim 1 further comprising:
a bezel operable to couple to a front surface of the chassis; and
an NFC support circuit having NFC support memory operable to store information in support of the NFC transactions;
wherein the NFC device is integrated with the bezel and the NFC support circuit is operable to cleanse the NFC support memory if an identifier associated with the NFC device fails to match an identifier associated with the management controller.

7. The server information handling system of claim 6 wherein the NFC support memory stores configuration information for configuration of the server information handling system to interface with a network.

8. The server information handling system of claim 7 wherein the NFC device is further operable to accept an identifier of a replacement server information handling system to allow retention of the configuration information if the bezel transfers to the replacement information handling system.

9. The server information handling system of claim 1 wherein the management controller is further operable to require identification information for a component by NFC transaction through the NFC device before authorizing installation of the component.

10. A method for reporting server information handling system faults, the method comprising:
   detecting a fault at a server information handling system;
   storing a fault code associated with the fault in memory accessible by an NFC device, the NFC device integrated with the server;
   reading the fault code from the NFC device with an NFC transaction after a power failure at the server information handling system;
   detecting the power failure of the server information handling system; and
   storing the fault code in the memory in response to the detecting the power failure.

11. The method of claim 10 wherein the memory comprises random access memory, the method further comprising:
   in response to the detecting the power failure, powering the random access memory with a back-up battery.

12. The method of claim 11 further comprising:
   removing a bezel from the server information handling system, the bezel including the NFC device;
   removing the server information handling system from a support slot;
   inserting a replacement information handling system into the support slot;
   attaching the bezel to the replacement information handling system; and
   copying configuration information from the NFC device to the replacement information handling system upon power up of the replacement server information handling system.

13. The method of claim 12 further comprising:
   performing an NFC transaction of an identifier of the replacement server information handling system to the NFC device before powering up the replacement server information handling system;
   comparing the identifier with an identifier retrieved from the replacement server information handling system upon power up of the replacement server information handling system; and
   allowing the copying configuration information only if the identifiers match.

14. The method of claim 12 further comprising:
   comparing an identifier stored on the replacement server information handling system with an identifier stored on the NFC device; and
   disabling application of the configuration information at the replacement server information handling system if the identifiers fail to match.

15. The method of claim 14 further comprising erasing the configuration information from the NFC device if the identifiers fail to match.

16. The method of claim 10 wherein detecting a fault indication at a server information handling system further comprises:
   detecting a power failure at the server information handling system; and
   in response to detecting a power failure, storing the fault code in memory accessible by an NFC device of the server information handling system when the server information handling system is powered down.

17. The method of claim 16 wherein the memory comprises a memory powered by a back-up battery.

18. A management subsystem for a server information handling system, the management subsystem comprising:
   a management controller integrated with a chassis of the server information handling system, the management controller operable to manage operations of processing components disposed in the chassis, the management controller further operable to detect power failure and in response to detecting power failure to store fault codes in a memory;
   a bezel operable to couple to the chassis;
   an NFC device integrated in the bezel and operable to perform NFC transactions with external NFC devices; and
   an NFC support circuit disposed between the NFC device and the management controller and having the memory, the memory storing the fault codes detected by the management controller in response to detecting power failure;
   wherein the NFC device is operable to provide the fault codes by NFC transaction to an external NFC device with the management controller powered off.

19. The management subsystem of claim 18 further comprising a battery interfaced with the NFC support circuit and operable to power the NFC support circuit when the management controller is powered off, the NFC support circuit operable to provide the fault codes to the NFC device using battery power.

* * * * *